United States Patent
Moldoveanu et al.

(10) Patent No.: US 10,834,088 B2
(45) Date of Patent: Nov. 10, 2020

(54) SEAMLESS AUTHORIZATION FLOW FOR SAAS APPLICATIONS

(71) Applicant: MICROSOFT TECHNOLOGY LICENSING, LLC, Redmond, WA (US)

(72) Inventors: Bogdan Moldoveanu, Bothell, WA (US); Pooja Shamjibhai Patel, Redmond, WA (US); Piotr Aleksander Ciszewski, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 45 days.

(21) Appl. No.: 16/203,337

(22) Filed: Nov. 28, 2018

(65) Prior Publication Data

US 2020/0169562 A1    May 28, 2020

(51) Int. Cl.
*H04L 29/06* (2006.01)
*H04L 29/08* (2006.01)

(52) U.S. Cl.
CPC ........ *H04L 63/102* (2013.01); *H04L 63/0807* (2013.01); *H04L 67/24* (2013.01); *H04L 67/26* (2013.01)

(58) Field of Classification Search
CPC ... H04L 63/102; H04L 67/26; H04L 63/0807; H04L 67/24
See application file for complete search history.

(56) References Cited

U.S. PATENT DOCUMENTS

| | | | |
|---|---|---|---|
| 7,162,454 B1 * | 1/2007 | Donner | G06Q 10/02 235/382 |
| 7,818,002 B2 * | 10/2010 | Bajko | H04L 63/08 370/331 |
| 8,261,290 B2 | 9/2012 | McCollum | |
| 9,660,818 B2 * | 5/2017 | Castro Castro | H04L 41/0893 |
| 10,257,205 B2 * | 4/2019 | Mathew | H04L 63/105 |
| 2007/0121596 A1 * | 5/2007 | Kurapati | H04L 63/10 370/356 |
| 2011/0320622 A1 * | 12/2011 | Cutler | H04L 12/14 709/230 |
| 2013/0322365 A1 * | 12/2013 | Garcia Martin | H04W 72/048 370/329 |

(Continued)

OTHER PUBLICATIONS

"International Search Report and Written Opinion Issued in PCT Application No. PCT/US2019/059576", dated Feb. 25, 2020, 14 Pages.

*Primary Examiner* — Michael Won
(74) *Attorney, Agent, or Firm* — Workman Nydegger

(57) ABSTRACT

Authorizing an entity to access data in a service. A method includes, at a service, creating a subscription, for a subscriber entity, to notifications of events for data. The method further includes, at the service, determining that the subscriber entity is in an authorization state indicating that the subscriber entity is required to reauthorize to the service to continue receiving notifications of events for the data. The method further includes, as a result of determining that the subscriber entity is in an authorization state indicating that the subscriber entity is required to reauthorize to the service to continue receiving notifications of events for the data, publishing a reauthorization notification to the subscriber entity to reauthorize the subscription.

20 Claims, 5 Drawing Sheets

(56) References Cited

U.S. PATENT DOCUMENTS

| | | | |
|---|---|---|---|
| 2015/0089569 A1* | 3/2015 | Sondhi | H04L 63/20 |
| | | | 726/1 |
| 2015/0236862 A1* | 8/2015 | Castro Castro | H04L 12/1407 |
| | | | 370/259 |
| 2015/0312140 A1* | 10/2015 | Yang | H04L 45/28 |
| | | | 370/218 |
| 2017/0118223 A1* | 4/2017 | Mathew | G06F 21/6218 |
| 2017/0163431 A1* | 6/2017 | Castro Castro | H04L 12/1407 |
| 2018/0295500 A1* | 10/2018 | Yang | H04W 8/183 |
| 2019/0103968 A1* | 4/2019 | Srinivasan | G06F 21/41 |
| 2020/0067907 A1* | 2/2020 | Avetisov | H04L 9/0825 |
| 2020/0127994 A1* | 4/2020 | Kukreja | H04L 63/0807 |
| 2020/0128002 A1* | 4/2020 | Khanna | H04L 63/0846 |

* cited by examiner

SEAMLESS AUTHORIZATION FLOW FOR SAAS APPLICATIONS

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud computing" systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

In this context, there is a category of applications that are interested in being notified about data changing in services, such as SaaS services. For example, an app wants to know when a new calendar entry is added, or modified, in the user's calendar stored in the SaaS service. It is not practical for the app, at scale, to keep polling the service to discover changes. For that reason, "webhooks", and other forms of "change notifications", have been adopted by the industry for such scenarios.

An app calls an API to "subscribe" to change notifications for a specific resource (e.g. email messages). The SaaS service performs complete authorization checks to determine if such a subscription should be created or not. Once a subscription is created, when resources change, they are pushed to an endpoint owned by the app developer, without any additional checks. This way the app becomes notified of new/modified resources. Eventually the subscription to the notification expires and needs to be renewed. This allows apps to be notified when a new resource is created, deleted or modified.

Some implementations only have "basic notifications" where the notification does not include the content of the resource. Instead the notification includes a resource id and information about whether the resource was created, deleted or modified. If the app wants to know more about the resource, it has to fetch it using a regular GET API call, which has associated authorization protocols to ensure that the app is still authorized to obtain the resources. For example, a notification may indicate to an app that an email was received, but it is up to the app to get the email from the service, including providing an appropriate valid token to the service.

"Rich notifications" are a response to developer feedback indicating that the push/pull model used with basic notifications is not efficient. Developers would want to receive the interesting properties (e.g., calendar information, email text, alert text, etc.) of a resource in the notification itself.

This changes the authorization situation, as systems can no longer rely on the checks previously performed for the GET calls on the resource, as the "pull" part, and its corresponding authorization protocol, is no longer part of the flow. Without modification, apps will continue having access to resource data for very long periods of time. For example, an app could receive email notifications for 3 days if the subscription is for 3 days, even if the admin introduced changes to data access policies that would ordinarily limit access to a shorter time, such as 1 hour.

On the other hand, forcing subscriptions to be short-lived (e.g., 1 hour) will put a burden on customer systems and cloud systems. For example, an email scanning app may maintain tens of thousands to hundreds of thousands of subscriptions per each enterprise tenant. Reliably renewing each such subscription every hour would put a high load on the app's infrastructure.

There is a trade-off here between the security of the customer data and the app developer experience. As authorization is performed only at subscription creation/renewal, the lifetime of the subscription defines how often authorization can be checked. If the subscription lifetime is too long (e.g. days or weeks) the authorization checks are too rare and any changes to user/device parameters, or admin policies, are not enforced, which risks violating customer expectations and trust.

If the subscription lifetime is too short (e.g. minutes or hours) then the development of high scale apps becomes difficult. An app may own hundreds of thousands, or millions, of subscriptions. If they all need to be reliably renewed every short time period, that becomes very expensive.

In summary, while subscription models, such as a webhook/change notification programming model is very handy for app developers, it suffers from the lack of any advanced flows that could reliably guarantee authorization checks are performed frequently, to meet the expectations of the data owners (the customer admins).

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of authorizing an entity to access data in a service. The method includes, at a service, creating a subscription, for a subscriber entity, to notifications of events for data. The method further includes, at the service, determining that the subscriber entity is in an authorization state indicating that the subscriber entity is required to reauthorize to the service to continue receiving notifications of events for the data. The method further includes, as a result of determining that the subscriber entity is in an authorization state indicating that the subscriber entity is required to reauthorize to the service to continue receiving notifications of events for the data, publishing a reauthorization notification to the subscriber entity to reauthorize the subscription.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
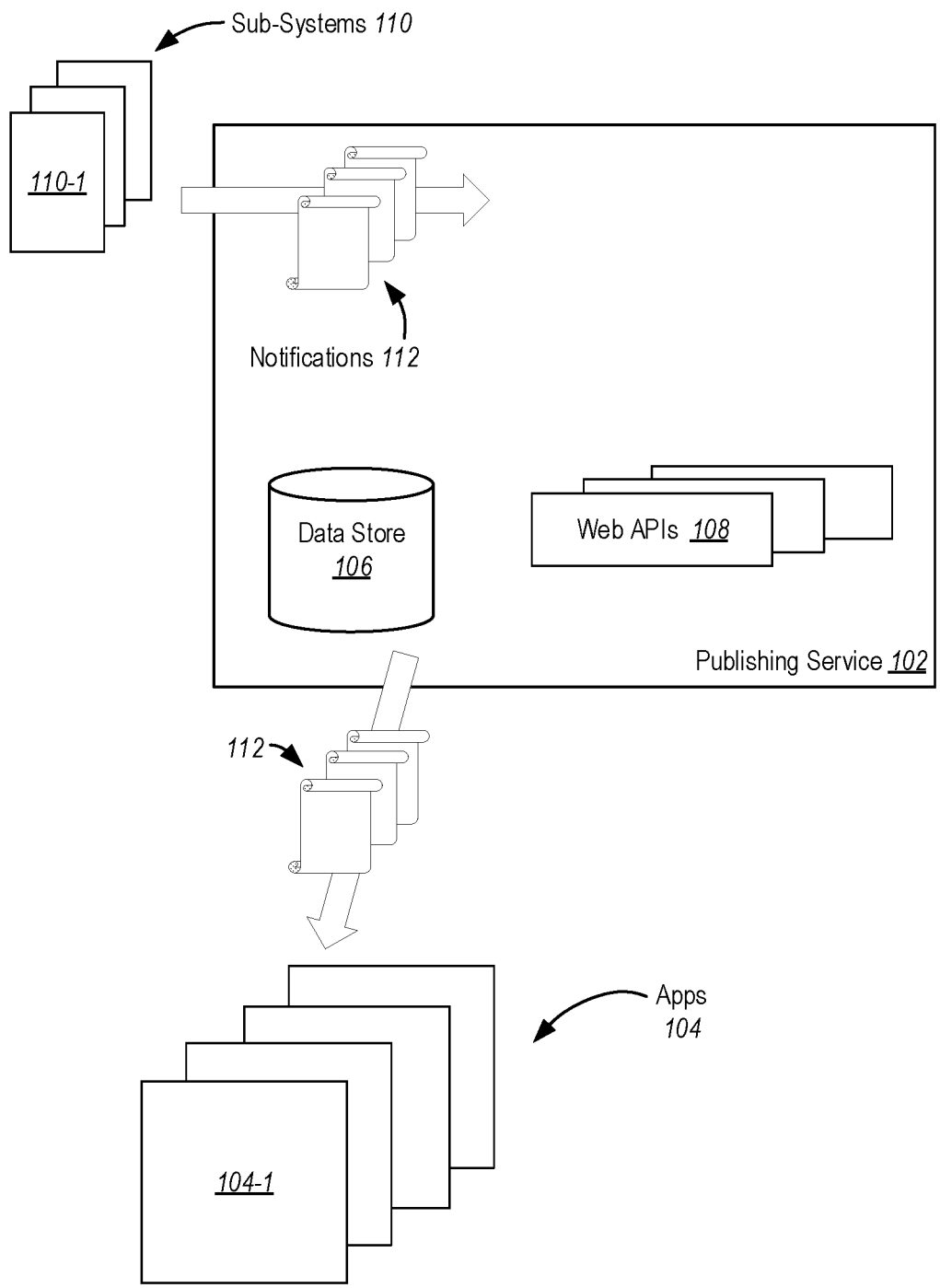
FIG. 1 illustrates a publishing service that publishes notifications to apps.

Embodiments illustrated herein implement an extend subscription model, such as a graph webhooks model, that allows for maintaining the same customer data authorization promises related to data access control that are guaranteed in "traditional" pull access models (e.g., apps calling Graph REST APIs, including delta query) while still allowing for subscription models to be used. Note that while webhooks is illustrated for the embodiments herein, it should be appreciated that other subscription models can be used in other embodiments of the invention.

Embodiments extend the push notification contract between Graph (or other subscription models) and the subscribing application in such a way, that there is a guaranteed, frequent (as defined by data access polices, where frequent is more often than some relevant authorization time-to-live), step in the flow that forces the app to reauthorize access using the same inputs that were used to subscribe to notifications in the first place. This ensures that if anything changes in a tenant's policies, or in the parameters of the subscribing app and user (e.g. users changing their network location or other controlled parameter), these changes will be re-evaluated and access to data denied, if appropriate.

Embodiments are implemented where applications create long-lived (e.g., 1 week, or some other appropriate predetermined standard for long-lived) subscriptions to resource changes, which simplifies developer code and maintenance. Authorization challenges are implemented as part of the webhook contract. For example, embodiments will pause notifications according to some short-lived (e.g., 1 hour, or some other appropriate predetermined standard for short-lived) time frame, and instead send a challenge notification to a URL, or other pointer, owned by the app. The app responds with an authorization token, which allows the system to perform the same authorization checks as at subscription creation time. If the checks pass, notifications resume.

This allows for approximately the same guarantees as with the traditional pull methods, without adding additional burdens on developers. Rather, authorization challenges allow apps to easily renew active subscriptions, even at large scale, such as when there are millions of subscriptions.

Thus, embodiments implement a new type of notification, referred to herein as an "authorization challenge" that causes the subscribing app to go through the existing authorization check layers. The SaaS service determines when such challenges should be issued (based on access policies and/or other factors) and the subscribing app does not need to understand any of the underlying complexity to remain compliant with customer policies. Instead, the app simply responds to challenges issued by the SaaS service, to keep the notification pipeline active.

Thus, embodiments seamlessly integrate an authorization workflow into a standard subscription contract, such as a webhook contract. When a 3rd party app subscribes, embodiments evaluate its authorization to access the data. Thereafter, embodiments periodically force the app to re-trigger the authorization flow using authorization challenges. This allows the underlying service, containing the customer data, to re-evaluate that the app still should have access to the data. It ensures that whatever the privacy and security settings of the customer are, they are always enforced no matter if the app uses webhooks or other means of accessing the data. For the 3rd party developer, it is easy to integrate with this workflow, as it retains the simple characteristics of the webhook development method, and other similar development methods.

SaaS applications, such as Office/Microsoft 365, available from Microsoft Corporation, of Redmond, Wash., are designed to store important customer data, such as emails, files and other organizational data. Such applications often contain sophisticated control mechanisms that allow customer admins to specify policies for access to data. This allows customers to secure their key organizational assets while they undergo digital transformation and take a bet on the cloud.

For example, Azure Active Directory Premium (a key component of Microsoft 365) offers features such as "conditional access". An admin can specify a policy, such as for example, one that allows access to email only from trusted network locations and from registered mobile devices. Users outside of those locations or not using registered mobile devices are either unable to access data, or must undergo a stronger authentication procedure (e.g. phone or other second factor authentication) to access data.

Applications calling a web API to access customer data undergo multiple layers of authorization checks. Various layers in the SaaS system will examine each call and enforce any data access policies. For example, a user using an email client from outside of corporate network may be asked to perform strong authentication using a phone, before the email client is allowed access to the email data. Such policies are evaluated dynamically taking into account user's current location, device parameters and other relevant factors.

Referring now to FIG. 1, an example embodiment is illustrated. FIG. 1 illustrates a publishing service 102. The publishing service 102 manages the subscriptions created by apps 104. Apps 104 are applications running on client devices that are configured to access resources of the publishing service 102 and other related SaaS systems, middle tier services, etc. The apps 104 could be any piece of software hosted anywhere. The publishing service 102 stores in a datastore 106 the current state of each successfully created subscription. Apps create, renew and delete subscriptions using web APIs 108.

The publishing service 102 allows lower level sub-systems 110 (such as an email service, a file service, a directory service) to send notifications 112 to the central publishing service 102. It then uses the data in the subscription to relay those notifications 112 to the final destination, typically the app endpoint specified in the subscription.

The publishing service 102 is centrally positioned in the notification flow which allows it to make extra decisions, such as forcing reauthorization of the subscribing app, such as subscribing app 104-1.

Subscriptions have a life-time. A subscribing app, such as subscribing app 104-1, has to renew a subscription to continue receiving notifications. A desirable life-time for many apps and services is in the range of multiple days, or even weeks, which makes large scale development easier.

Figure 2:
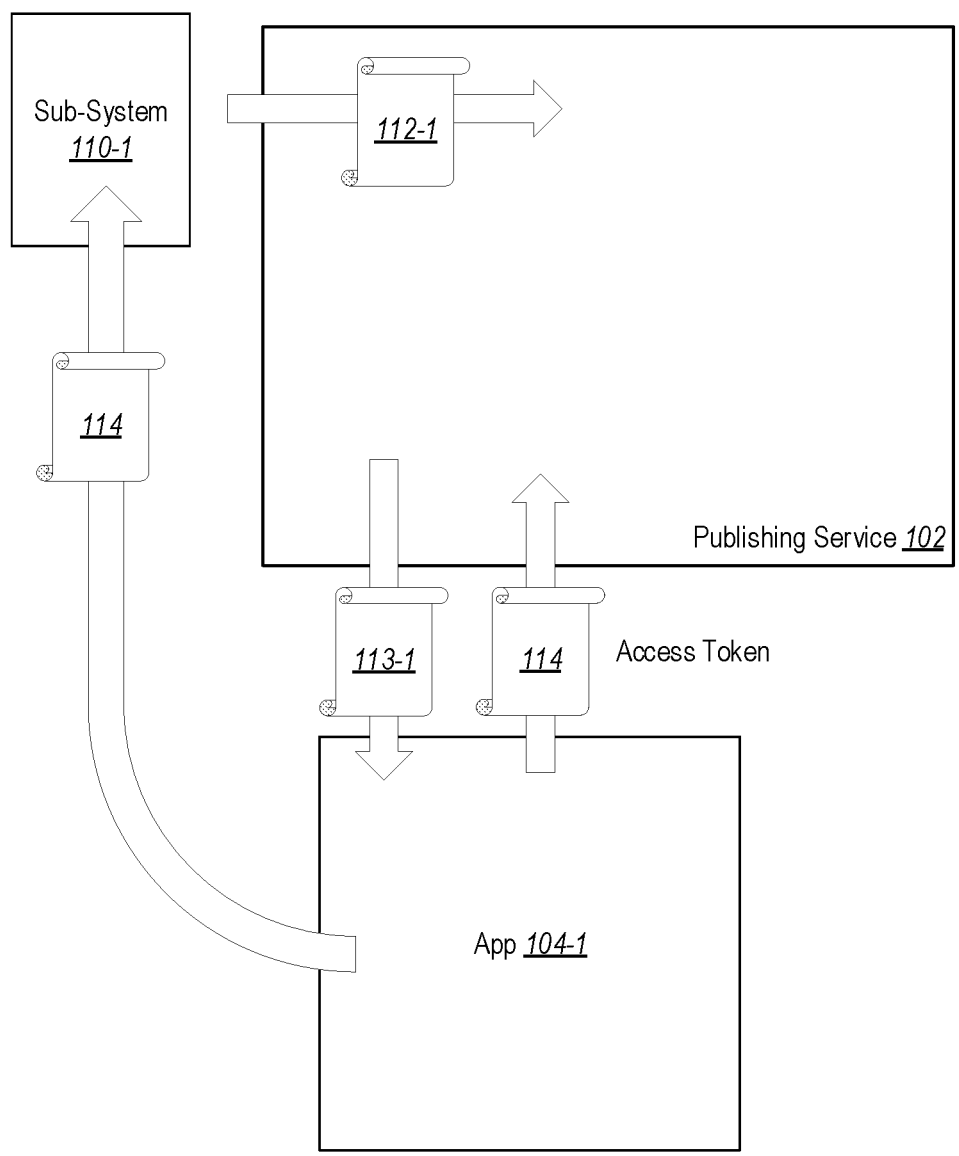
FIG. 2 illustrates a reauthorization process of an app to the publishing service.

Referring now to FIG. 2, the new concept of "authorization freshness" stands for the proposition that a subscription can be well within its life time but the app's authorization to receive customer data may be considered "stale", for example based on policy for the customer data. That is, policy for the customer data may require authorization at a frequency that has a period that is less than the life time of the subscription. In some embodiments, this will be determined by an authorization token time to live. The app 104-1 will be notified by the publishing service 102 that it needs to present a current access token to be evaluated by the SaaS service, e.g., the sub-system 110-1. Typically, this is done by pushing a notification 112-1, as part of the subscription, the notification 112-1 identifying that reauthorization needs to be performed by the app.

When a notification 112-1 is pushed by a sub-system 110-1 to the publishing service 102, the publishing service 102 determines if authorization for the subscription is still fresh. If yes, the publishing service relays the notification 112-1 to the subscribing app 104-1. If not, it issues a special "reauthorization challenge" reauthorization notification 113-1 to the subscribing app 104-1, requesting it to respond with a valid access token 114. The access token 114 may be sent to the publishing service 102 (and forwarded on by the publishing service to the sub-system 110-1) or directly to the sub-system 110-1, dependent on an endpoint specified in the notification 113-1. The SaaS sub-system 110-1 evaluates the token 114 using the standard authorization flow. If checks pass, other notifications, including potentially rich notifications described above, resume. If not, notifications 112 remain on-hold, preventing the subscribing app from accessing customer data. Note that as described below, in some embodiments, notifications may be completely stopped pending reauthorization. In other embodiments, reauthorization notifications may be pushed, but other notifications will be stopped. In yet other embodiments, rich notifications may be stopped, but more basic notifications (such as where the notification does not include the content of the resource, but instead the notification includes a resource id and information about whether the resource was created, deleted or modified, etc.) may be pushed until reauthorization occurs. These various embodiments will be described in more detail below.

Embodiments implement push driven subscription reauthorization. The publishing service 102 uses the same familiar notification flow to let the subscribing app 104-1 know when it needs to reauthorize access. This makes app development much easier at scale—instead of having to frequently renew every single subscription on a schedule, the app 104-1 can rely on these special notifications to reauthorize only the active subscriptions with pending notifications.

The app developer can build a separate flow for reliably renewing all subscriptions every N days (or other time period as appropriate). At the same time the existing code that consumes notifications can be easily extended to respond to reauthorization challenges frequently. The end result is meeting customer expectations regarding data access controls while retaining the ease of development associated with webhooks and other subscription based models.

Some embodiments use access token lifetime to determine authorization/reauthorization periods. In some embodiments, the duration of "authorization freshness" is determined by the publishing service 102 based on the time-to-live of the access token presented by the subscribing app 104-1.

Customer admins can control the lifetime of access tokens for each data resource using the tokens. By looking at token lifetime, the publishing service, e.g., sub-system 110-1, guarantees that access to data is controlled the same way as with other data access methods. This guarantees that customer admin expectations are met.

Figure 3:
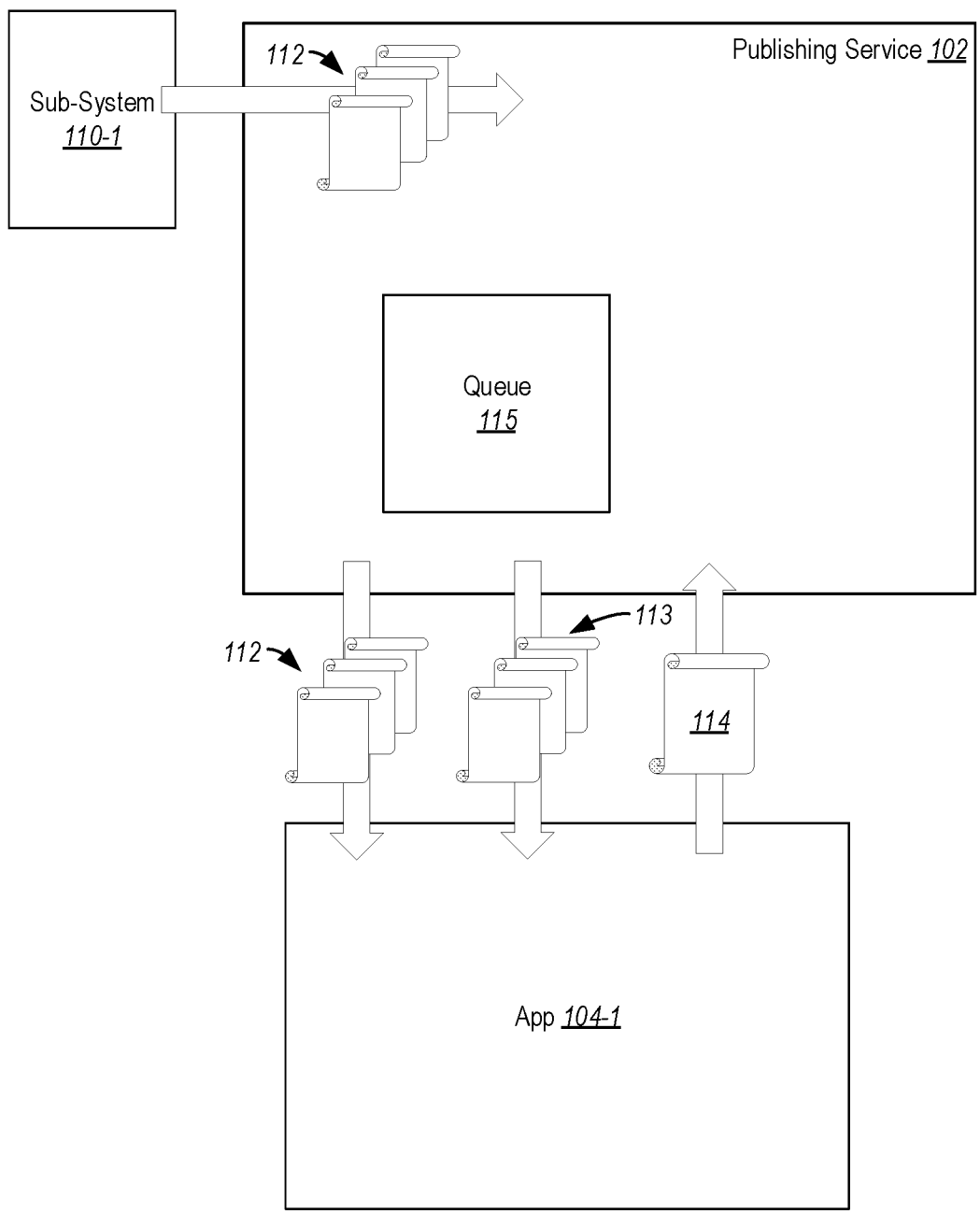
FIG. 3 illustrates the publishing service sending notifications for data events and reauthorization notifications.

Referring now to FIG. 3, some embodiments, implement a grace period for reauthorization. In these embodiments, reauthorization can be performed before it is actually required. That is, reauthorization can be performed ahead of time. In some embodiments, to optimize for scenarios that require an uninterrupted stream of notifications 112, the publishing service 102 will issue reauthorization challenges (e.g., notifications 113) slightly (or within some predetermined timeframe) before they are actually required. These challenges will be sent without blocking the other notifications 112 from the sub-system 110-1. This allows the subscribing app 104-1 to reauthorize the subscription, by sending the token 114, without interrupting the notification flow. If the app 104-1 fails to reauthorize within the grace period, other notifications 112 from the sub-system 110-1 are interrupted.

This grace period flow is as follows: Assume N is the authorization freshness period:

At time (N-M) the service will start issuing reauthorization challenges (e.g., notification 113-1 illustrated in FIG. 2), but will also continue to send regular notifications (e.g., notifications 112).

At M, the service will only send reauthorization challenges (e.g., notifications 113) (and/or less rich, e.g., basic notifications), and regular, rich notifications 112 will be put on hold, by holding the notifications in the queue 115.

Figure 4:
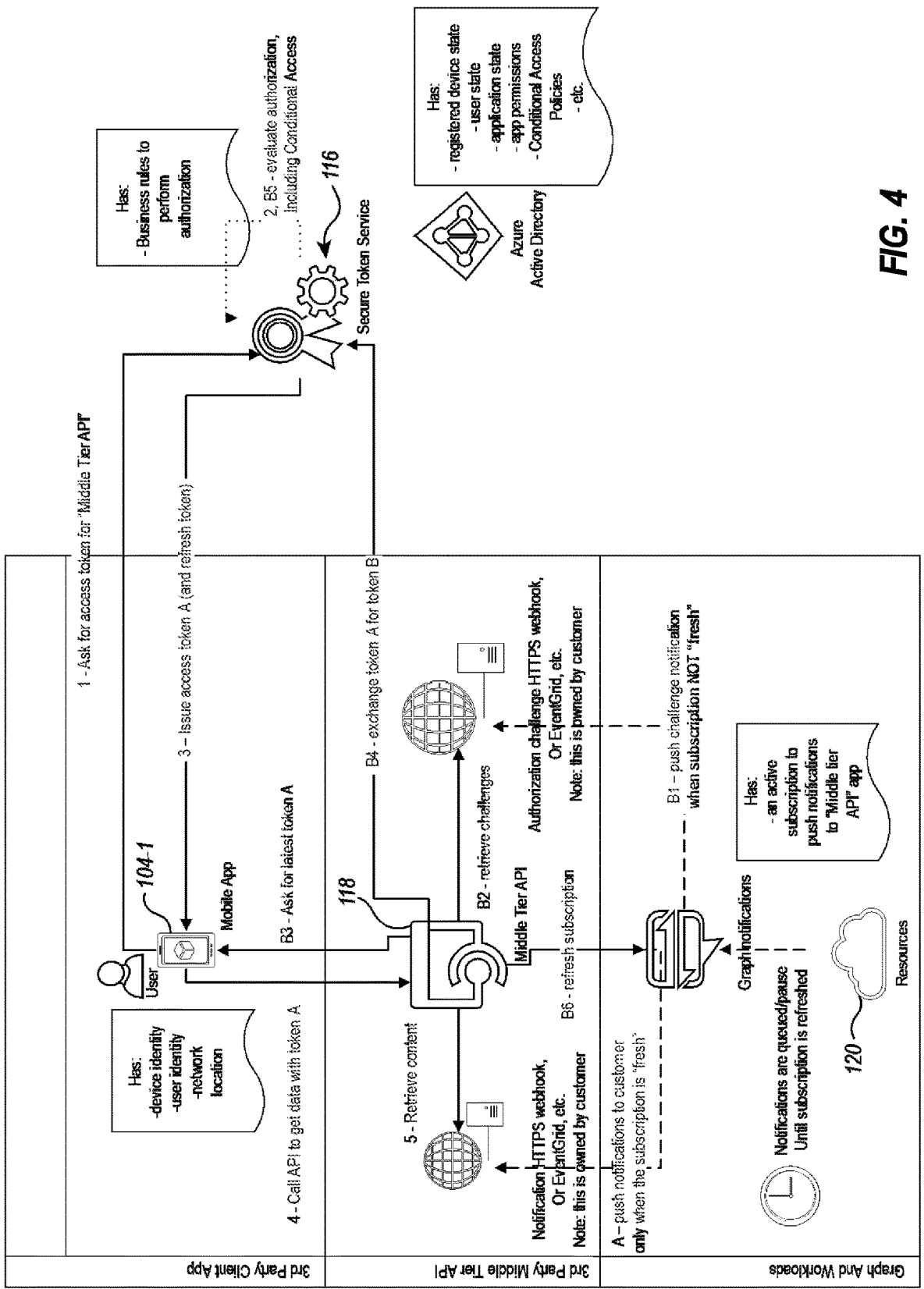
FIG. 4 illustrates a detailed flow for one example embodiment.

Referring now to FIG. 4, a detailed flow diagram is illustrated. The example illustrated is illustrated in the context of Graph, but the principles illustrated may be used in any appropriate system.

There are 3 separate flows illustrated.

In the first flow illustrated by steps 1-5, the app 104-1 is communicating with its middle tier 118 to fetch data it may have pending. At step 1, the app 104-1 asks secure token service 116 for a token for the middle tier API. At step 2, the secure token service 116 evaluates authorization for the app 104-1 to determine if the token can be issued. This may include evaluating conditional access requirements, such as device requirements, location requirements, secure network connectivity requirements, or any other requirements a data custodian may wish to apply. If the request meets the requirements, then as illustrated at step 3, the token is issued and refreshed. At step 4, the app 104-1 will use the token to call the API of the middle tier 118. The middle tier 118 may be a sub-system, such as sub-system 110-1 illustrated above, a service on the publishing service 102, or other appropriate entity. At step 5, content is retrieved.

In the second flow, represented at A, Graph is pushing notifications from the resources 120 to the endpoint, where the notifications can be retrieved by the middle tier 118 and provided to the app 104-1. This flow is "paused" when Graph determines the subscription is not fresh. The resources 120 may be, for example, the sub-systems 110-1 illustrated above.

The third flow, illustrated by B1-B6 is Graph challenging the subscribing app 104-1 to reauthorize its subscription. The app then retrieves the token necessary to do this, which triggers authorization re-evaluation with STS (step B5). Specifically, at B1, a challenge notification, which is one of the reauthorization notifications 113, discussed above, is pushed when a subscription is not fresh. As illustrated at B2, challenge notifications are retrieved by the middle tier 118 and provided to the app 104-1. Specifically, as illustrated at B3, the middle tier 118 requests the latest token. At B4, the mobile app can cause the middle tier to retrieve the latest token from the secure token service 116. At B5, the secure token service evaluates authorization requirements, including any conditional access requirements as described above. Assuming all requirements are met, as illustrated at B6, the subscription is refreshed (i.e., reauthorized) and notifications resume from the resources 120.

Notifications are only pushed to the app endpoint while the subscription is "fresh".

When a notification is sent from the workload (e.g., the sub-system, such as an email service) the publishing service checks if the subscription is fresh. If the subscription is not fresh, the publishing service queues the notification and instead sends an "authorization challenge" notification.

The app responds to the challenge notification in a similar way it uses for subscription renewal: it calls a Graph API with a token to reauthorize a specific subscription. This forces it to go through the same authorization steps as to create the subscription.

Note: in FIG. 4, the middle tier 118 calls out to the client mobile app 104-1 to get a new "token A", and then redeems it for "token B". This is implemented in some embodiments, as it allows authorization systems to check the latest external parameters (device id, network location, etc.)

The middle tier 118 could instead just reauthorize token B it obtained previously, which would use the old external parameters.

In some embodiments, authorization challenges are only sent if there is at least one pending notification. If there is nothing to push, in some embodiments, there is no challenge. This can provide the advantage of the app not needing to waste resources reauthorizing "empty" subscriptions.

Subscriptions already have a lifetime which is comparatively long (days). In contrast, subscription freshness expires at approximately a token lifetime.

If there is a pending notification, the system responsible for pushing it to the app endpoint, will check if the subscription is within its freshness. If yes, it will push a notification, otherwise it will push an authorization challenge instead, where rich notifications will be queued for later.

In some embodiments, if the Graph publishing service is used as the intermediary between a workload and an app endpoint, it will execute this logic. The service already needs to check subscription state to look up the webhook endpoint, so it can be extended to have this extra logic. The workloads get extra value from using the Graph publishing service.

Alternatively or additionally, in some embodiments, if the workload is publishing notifications directly, then it will execute this logic.

Note that in general, embodiments are implemented where authorization challenges do not replace the need for subscription renewal.

In some embodiments, the authorization challenges are only pushed when there is some notification(s) pending for that subscription. In these embodiments, the workload triggers the flow based on some activity. In a case where a subscription has been "silent" nothing will be sent, and the subscription will eventually expire without any challenges being sent. This can be done to prevent the requirement for infrastructure to monitor all subscriptions, including silent ones. Note, however, that in other embodiments, reauthorization notifications may be sent any time an authorization expires, irrespective of whether or not other notifications are queued to be pushed to an app.

In some embodiments, when an app renews a subscription, that operation also "reauthorizes" the subscription, such that the subscription is fresh. In such embodiments, developers can be provided with a choice to renew subscriptions aggressively—on a short timer—in which case they won't see any authorization challenges at all. Consider the following example.

An app creates a subscription. Policy requires tokens to be reauthorized every hour. There are no notifications for this subscription for the next 2 hours, so the app has received nothing. Graph finally has a notification, but it decides it cannot push it because the subscription is not "fresh" (e.g., it has been over a token time-to-live, e.g., 1 hour since it was created/renewed). The app sees an authorization challenge before it receives even one notification. It responds to the authorization challenge, and the notification is then delivered. For the next 1 hour, notifications will flow uninterrupted.

The following illustrates an example of how an app developer would access functionality of embodiments illustrated herein.

A subscription specifies two notification endpoints: one for notifications for events for data and one for challenges using reauthorization notifications (although in other embodiments, a single endpoint may be specified for both types of notifications). Alternatively, the developer can choose to provide the same URL twice, if they want to handle both in the same place.

The app creates and renews subscriptions, as usual. Subscriptions still need to be renewed before expiration. Some embodiments may extend subscription lifetime, such as for example, from a standard 3 days to 1 week or more, since embodiments no longer depend on subscription renewal for authorization checks.

The app is designed by the developer to handle authorization challenges. A challenge, in the form of a reauthorization notification, will specify which subscription needs to be reauthorized. The app simply needs to call an API for that subscription. The code used to do this, in some embodiments, is the same as for subscription renewal, so a developer can simply reuse the same code. The app is designed by the developer to re-obtain an access token.

While embodiments illustrated herein have shown examples that reference an app+user authentication mode (e.g., FIG. 2 illustrates that apps obtain access tokens from the user and use delegated permissions when interacting with Graph), app-only modes may alternatively or additionally be implemented. Developers can register applications that authenticate without the user. These apps will receive authorization challenges, and they will be able to respond to them without user interaction, using their own app permissions. Any supported authentication mode can be used.

Embodiments can be implemented to approximate the data access guarantees that exist in prior art pull models. Apps will lose access within any appropriate time frame, as determined by policy.

Embodiments herein may be implemented with queues that are larger than prior art notification queues. This may be done to store additional notifications. For example, a queue, such as queue 115, will need to be able to bank notifications while pausing notifications while waiting for a challenge response.

Some embodiments include functionality for reacting to immediate revocation. Some such embodiments may include logic to disable subscriptions based on certain events.

Typically, embodiments do not set a fixed, system-wide interval for subscription "freshness" because admins are able to customize token lifetime on a per resource basis. For example, an admin can configure a service to issue tokens for access to a workload resource for only 15 minutes, after which the tokens need to be reauthorized.

To respect those settings in the notification flow, every time an app presents an access token to create/renew/reauthorize a subscription, embodiments use the expiration time in the token to set the subscription freshness. Authorization challenges will be sent around the same time the token would have expired in the pull flow, which causes the same data access experience and guarantees that the admin expects.

The consequence is that the frequency of authorization challenges will vary from tenant to tenant, or from resource to resource. The app developer takes this into account when they do capacity planning on their side. The app developer will develop apps that may need to respond to challenges way more frequently than some default setting, based on additional tenant settings.

Embodiments may be implemented where subscription renewal and challenge responses have the same effect. If an app renews a subscription, that operation also "reauthorizes" the subscription. Developers will have a choice to renew subscriptions aggressively—on a short timer—in which case they may not see any authorization challenges at all, if renewal is sufficiently aggressive. In particular, if the renewal rate is at least as frequent as the reauthorization rate, then typically no authorization challenges will be pushed.

In some embodiments, "reauthorizing" a subscription will also renew it. In some embodiments, the difference between "renew" and "reauthorize" is the time intervals, and the fact that authorization challenges are only fired when there is a pending notification. Otherwise, the effects of both is the same: the subscription is extended for another N days and any queued notifications are un-paused.

Some embodiments may be implemented with a default that subscriptions are short lived (e.g., on an order similar to a set of predetermined token reauthorization rates), then apps will have to renew subscriptions frequently. Introducing challenges, which will have the same or longer duration, means that apps do not have to modify their code to handle challenges—it becomes optional for them. This can be done to allow embodiments to be implemented in legacy systems where apps do not have functionality of handling challenges.

Embodiments may be implemented to handle reauthorization challenges that are not answered timely. In particular, prior art systems include publishing services that queue notifications for delivery. This allows them to handle intermittent errors. For example, when a notification cannot be posted to the app endpoint, the service will retry several times. If the notification fails delivery up to 4 hours, it is dropped. Some embodiments may implement an extended error time period, for example, up to 24 hours before dropping notifications. This can be done as the new technology illustrated herein is deployed to allow developers to build reliable solutions based on rich notifications. For example, embodiments may include the queue 115 illustrated in FIG. 3 to hold notifications to be delivered to apps.

Embodiments may be implemented where the notification framework can guarantee that data is subject to exactly the same access controls as in the traditional web API flows where data is pulled by the app from the system.

Embodiments may be implemented where customer admins do not need to understand which apps use notifications vs not, making it possible for admins to be confident their data is subject to policies regardless of the development model chosen by app developers.

Embodiments may be implemented where the notification framework dynamically adjusts the authorization interval as a function of the authentication token.

The authentication token contains the "time to live" value based on admin configuration. This is used to drive authorization challenges.

Embodiments may be implemented where the notification framework does not need to copy or mirror the sophisticated authorization logic in the SaaS service. Instead, the framework forces the app to trigger the same logic that is already in use for subscription creation and renewal, which in turn is the same as the logic executed for traditional pull access to data.

Some embodiments extend the webhook/push notification programming model. They can retain the ease of development and developers can easily extend their code to handle the extra authorization challenges. However, the invention is not limited to webhooks.

Apps do not need to become aware of the complex policies controlling data access to continue to use notifications.

The solution allows for maintaining of a single centralized "publishing service". The service is agnostic of the data being published via notifications; e.g. multiple sub-systems (such as an email service, a file service, a directory service) can all plug into the publishing service.

The publishing service takes care of managing the authorization flow on behalf of those services making the sub-system development simpler and ensuring the authorization flow is correct and not subject to N correct implementations, one for each sub-system.

The publishing service triggers the same common authorization flow already in place, which relies on the sub-systems performing additional authorization checks specific to them. No net new logic needs to be introduced in the end to end system resulting in additional simplification.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
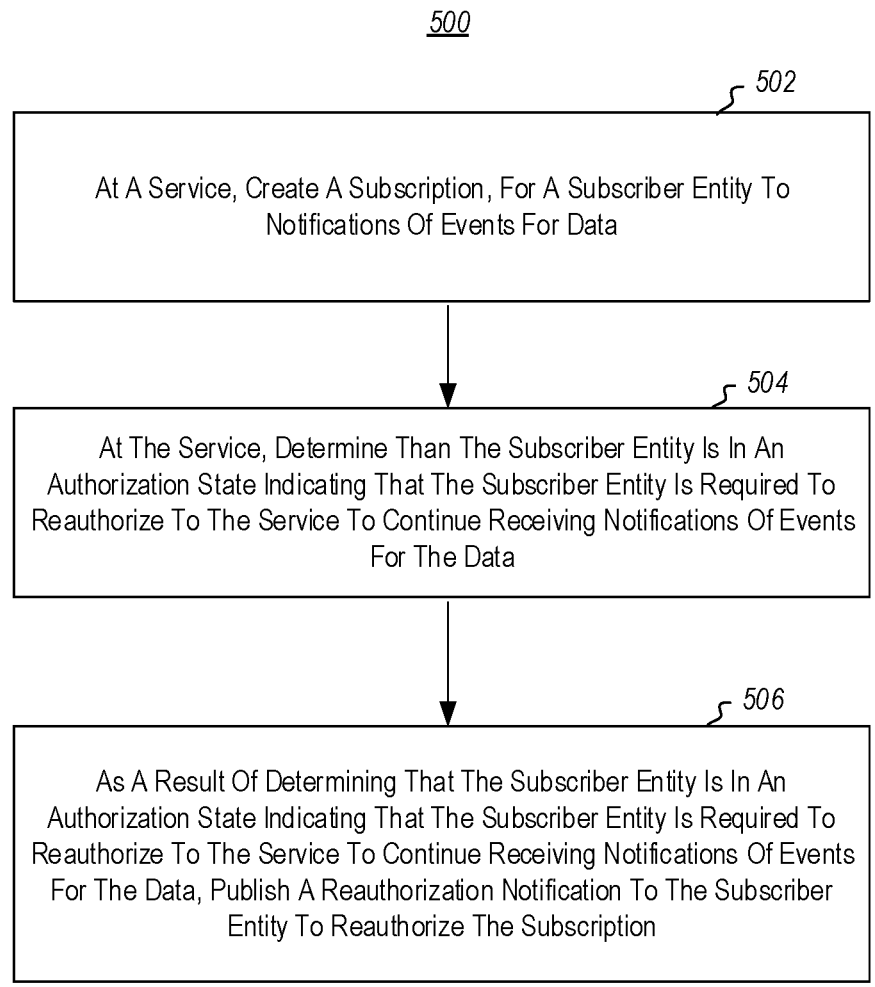
FIG. 5 illustrates a method of authorizing an entity to access data in a service.

Referring now to FIG. 5, a method 500 is illustrated. The method includes acts for authorizing an entity to access data in a service. The method 500 includes, at a service, creating a subscription, for a subscriber entity to notifications of events for data (act 502). For example, as illustrated above, an app 104-1 (or other entity) may subscribe to the publishing service 102 to receive notifications 112 from a sub-system 110-1.

The method 500 further includes, at the service, determining that the subscriber entity is in an authorization state indicating that the subscriber entity is required to reauthorize to the service to continue receiving notifications of events for the data (act 504). For example, the publishing service 102 may determine, based on some policy, that the app 104-1 needs to be reauthorized to continue receiving notifications 112. As will be described below, the state may indicate an immediate need to reauthorize, or the state may indicate an anticipatory need to reauthorize.

As a result of determining that the subscriber entity is in an authorization state indicating that the subscriber entity is required to reauthorize to the service to continue receiving notifications of events for the data, the method 500 further includes publishing a reauthorization notification to the subscriber entity to reauthorize the subscription (act 506). For example, the publishing service 102 sends the reauthorization notification 113-1 to the app 104-1 to indicate to the app 104-1 that it should reauthorize.

The method 500 may be practiced where the notifications of events include at least a portion of the data. For example, the notifications 112 may include email text, calendar details, or other payload data. For example, the rich notifications described above may be sent.

The method 500 may be practiced where the notifications of events include metadata about the data, but excludes the data. For example, the notifications 112 may exclude email text, calendar details, or other payload data, but rather indicate that an email is available to be fetched, that a calendar has been updated, or simply that a new message exists for the app 104-1 at the sub-system 110-1. For example, the basic notifications above may be sent.

The method 500 may further include pausing publishing at least a portion of notifications of events for the data to the subscriber entity (although some embodiments, do not pause publishing reauthorization notifications 113); reauthorizing the subscriber entity; and as a result, resuming publishing notifications of events for the data to the subscriber entity. For example, as illustrated in FIG. 3, some embodiments may stop sending notifications 112 and store the notifications 112 in the queue 115, while continuing to send reauthorization notifications 113. Once the app 104-1 has been reauthorized, such as by sending the access token 114, notifications 112 can resume. Thus, some such embodiments may include accumulating notifications of events for the data intended for the subscriber entity, e.g., by storing them in the queue 115, while pausing notifications of events for the data. Some such embodiments further include synchronously delivering accumulated notifications of events for the data to the subscriber entity as a result of the subscriber entity reauthenticating. Synchronously delivering notifications means that some type of handshaking occurs. In some embodiments, when the app 104-1 causes the access token 114 to be provided, then messages stored in the queue 115 are delivered, sometime in bulk, to the app 104-1.

The method 500 may be practiced where sending a reauthorization notification is performed each time a notification of events for the data is generated while the subscriber entity is in an authorization state indicating that the subscriber entity is required to reauthorize to the service to continue receiving notifications of events for the data. Thus, for example, when any of the notifications 112 are received from the sub-system 110 at the publishing service 102, for the app 104-1, and the app needs to be reauthorized before receiving any of the notifications 112, the publishing service will instead send one of the reauthorization notifications 113 to the app 104-1. Thus, a reauthorization notification will be sent instead of a notification of an event.

The method 500 may be practiced where sending a reauthorization notification is performed each time a predetermined number of notifications of events for the data is generated while the subscriber entity is in an authorization state indicating that the subscriber entity is required to reauthorize to the service to continue receiving notifications of events for the data. Thus, for example, instead of a 1-to-1 ratio of held notifications 112 to sent reauthorization notifications 113, embodiments may send one reauthorization notification for a given number of held notifications of events for the data. This may be a fixed number, such as for example, every time 10 of the notifications 112 are received by the publishing service while the app 104-1 needs to be reauthorized, one reauthorization notification 113 will be sent to the app 104-1. However, in some embodiments, the method 500 may be practiced where the predetermined number is a random number. This may be done, for example, to obfuscate information about the number of events potentially available to the subscriber entity (e.g., the app 104-1).

The method 500 may be practiced where sending a reauthorization notification is performed at a predetermined time interval while the subscriber entity is in an authorization state indicating that the subscriber entity is required to reauthorize to the service to continue receiving notifications of events for the data. For example, a global timer could be used to indicate when reauthorization notifications should be sent. This could be used as a method of obfuscation of the number of events, so as to prevent an app that is not authorized for receiving notifications about events for data from deducing that notifications are being generated and/or queued.

The method 500 may be practiced where sending a reauthorization notification is performed based on known expirations of tokens. That is, when it is known that a token has expired or will shortly expire, a reauthorization notification may be sent. In such embodiments, there is no need for a notification of an event to be generated first.

The method 500 may be practiced where the subscriber entity is in an authorization state indicating that the subscriber entity is required to reauthorize to the service to continue receiving notifications of events for the data as a result of expiration of a predetermined time period. In some embodiments, the predetermined time period is determined by the service. Alternatively or additionally, the predetermined time period is determined by a custodian of the data (e.g., an administrator for a tenant of a service). Thus, for example, the predetermined time period is based on at least one of service tenant requirements, regulation-based requirements, HIPPA requirements, role-based requirements, etc.

The method 500 may be practiced where the subscriber entity is in an authorization state indicating that the subscriber entity is required to reauthorize to the service to continue receiving notifications of events for the data as a result of an instant revocation of authorization by the server. For example, the publishing service 102 or the sub-system 110-1 may detect some condition and revoke access to data, causing a reauthorization notification to be sent.

The method 500 may further include, while the subscriber entity is in an authorization state indicating that the subscriber entity is required to reauthorize to the service to continue receiving notifications of events for the data, pausing publishing rich notifications which include portions of the data, to the subscriber entity; and publishing instead, minimized notifications of events for the data to the subscriber entity. For example, a minimized notification could be just a notification indicating simply that something happened that may be of interest to the application 104-1. Alternatively, slightly more information may be provided, such as a notification that an email was received, or that a calendar was updated, etc. In some such embodiments, the method may further include reauthorizing the subscriber entity; and as a result, publishing rich data to the subscriber entity for minimized notifications of events for the data. Thus, for example, rich data, including portions of the data for the notification could be stored in the queue 115 while basic notifications, not including any of the data could be sent to the app 104-1. When the subscriber entity is reauthorized, all of the rich data stored in the queue 115 could be sent to the app.

The method 500 may be practiced where the reauthorization notification is sent using the same channel as the notifications of events for the data. For example, the same notification publishers and endpoints may be used for sending and receiving notifications 112 and 113. Alternatively, the method 500 may be practiced where the reauthorization notification is sent using a different channel than the notifications of events for the data. For example, different notification publishers and endpoints may be used for sending and receiving notifications 112 and 113.

The method 500 may be practiced where the reauthorization state is an anticipatory reauthorization state indicating that an authorization for the subscriber entity will be invalid within some predetermined time, such that the reauthorization notification is published before the authorization of the subscriber entity becomes invalid. In some such embodiments, notifications of events for the data will continue to be sent until the reauthorization is actually required. Some such embodiments o the invention may further include determining that the authorization of the subscriber entity has become invalid, and as a result, pausing publishing notifications of events for the data. This may include storing notifications of events for the data (e.g., notifications 112) in the queue 115.

The method 500 may be practiced where the subscription is implemented as a result of implementing web hooks.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of authorizing an entity to access data in a publication and subscription service, the method comprising:
    at one or more processors at the service, managing a subscription for receiving published notifications from the service, for a subscriber entity, the subscription being managed for the subscriber entity to receive published notifications of events for data from a subsystem by the service receiving events from the subsystem and publishing the events to the subscriber entity according to the subscription;
    at the service, determining that the subscriber entity is in an authorization state indicating that the subscriber entity is required to reauthorize to the service, to reauthorize the subscription, to continue receiving notifications of events for the data using the subscription, wherein the authorization state is an anticipatory reauthorization state indicating that an authorization for the subscriber entity will be invalid within some predetermined time; and
    as a result of determining that the subscriber entity is in an authorization state indicating that the subscriber entity is required to reauthorize to the service, to reauthorize the subscription, to continue receiving notifications of events for the data, publishing a reauthorization notification, such that the reauthorization notification is published before the authorization of the subscriber entity becomes invalid, using the subscription, to the subscriber entity to reauthorize the subscription.

2. The method of claim 1, wherein the notifications of events for the data include at least a portion of the data.

3. The method of claim 1, further comprising:
    pausing publishing at least a portion of notifications of events for the data to the subscriber entity;
    reauthorizing the subscriber entity; and
    as a result, resuming publishing notifications of events for the data to the subscriber entity.

4. The method of claim 3, further comprising accumulating notifications of events for the data intended for the subscriber entity as a result of pausing notifications of events for the data.

5. The method of claim 4, further comprising synchronously delivering the accumulated notifications of events for the data to the subscriber entity as a result of the subscriber entity reauthenticating.

6. The method of claim 1, wherein sending a reauthorization notification is performed each time a notification of events for the data is generated while the subscriber entity is in a reauthorizing state.

7. The method of claim 1, wherein sending a reauthorization notification is performed each time a predetermined number of notifications of events for the data is generated while the subscriber entity is in an authorization state indicating that the subscriber entity is required to reauthorize to the service to continue receiving notifications of events for the data.

8. The method of claim 7, wherein the predetermined number is a random number.

9. The method of claim 1, wherein sending a reauthorization notification is performed at a predetermined time interval while the subscriber entity is in an authorization state indicating that the subscriber entity is required to reauthorize to the service to continue receiving notifications of events for the data.

10. The method of claim 1, wherein sending a reauthorization notification is performed based on known expirations of tokens.

11. The method of claim 1, wherein the subscriber entity is in an authorization state indicating that the subscriber entity is required to reauthorize to the service to continue receiving notifications of events for the data as a result of expiration of a predetermined time period.

12. The method of claim 11, wherein the predetermined time period is determined by the service.

13. The method of claim 11, wherein the predetermined time period is determined by a custodian of the data.

14. The method of claim 1, wherein the subscriber entity is in an authorization state indicating that the subscriber entity is required to reauthorize to the service to continue receiving notifications of events for the data as a result of a revocation of authorization by the server.

15. The method of claim 1, further comprising:
    while the subscriber entity is in an authorization state indicating that the subscriber entity is required to reauthorize to the service to continue receiving notifications of events for the data, pausing publishing rich notifications, including portions of the data, to the subscriber entity; and
    publishing instead, metadata regarding events for the data to the subscriber entity, while excluding the portions of the data.

16. The method of claim 15, further comprising:
    reauthorizing the subscriber entity; and
    as a result, publishing rich data to the subscriber entity for minimized notifications of events for the data.

17. The method of claim 1, further comprising, determining that the authorization of the subscriber entity has become invalid, and as a result, pausing publishing notifications of events for the data.

18. A computer system comprising:
    one or more processors; and one or more computer-readable media having stored thereon instructions that are executable by the one or more processors to configure the computer system to authorizing an entity to access data in a publication and subscription service, including instructions that are executable to configure the computer system to perform at least the following:

at least one processor at the service, manage a subscription for receiving publishes notifications from the service, for a subscriber entity, the subscription being managed for the subscriber entity to receive published notifications of events for data from a sub-system by the service receiving events from the sub-system and publishing the events to the subscriber entity according to the subscription;

at the service, determine that the subscriber entity is in an authorization state indicating that the subscriber entity is required to reauthorize to the service, to reauthorize the subscription, to continue receiving notifications of events for the data using the subscription, wherein the authorization state is an anticipatory reauthorization state indicating that an authorization for the subscriber entity will be invalid within some predetermined time; and as a result of determining that the subscriber entity is in an authorization state indicating that the subscriber entity is required to reauthorize to the service, to reauthorize the subscription, to continue receiving notifications of events for the data, publish a reauthorization notification, such that the reauthorization notification is published before the authorization of the subscriber entity becomes invalid, using the subscription, to the subscriber entity to reauthorize the subscription.

19. A method of authorizing an app to access data in a service, the method comprising:

at an app, requesting a subscription to receive published notifications from a publication and subscription service, for the app, to notifications of events for data, the subscription being managed for a subscriber entity to receive published notifications of events for data from a sub-system by the service receiving events from the sub-system and publishing the events to the subscriber entity according to the subscription;

as a result receiving one or more notifications of events for data;

receiving from the service, a published subscription message including a reauthorization notification indicating that the app is in an authorization state indicating that the app is required to reauthorize to the service to continue receiving notifications of events for the data, wherein the authorization state is an anticipatory reauthorization state indicating that an authorization for the subscriber entity will be invalid within some predetermined time such that the reauthorization notification is received before the authorization of the subscriber entity becomes invalid;

causing a refreshed token to be provided to the service to reauthorize the subscription; and as a result, receiving additional notifications of events for data for the subscription.

20. The method of claim 19 further comprising receiving accumulated notifications of events from the subscription service as a result of the subscription service pausing notifications of events due to the authorization subsequently having become invalid.

* * * * *